United States Patent [19]

Fergg et al.

[11] 4,103,996

[45] Aug. 1, 1978

[54] METHOD AND APPARATUS FOR EVALUATING AND PROCESSING A STRIP OF ORIGINALS TO BE COPIED

[75] Inventors: Berthold Fergg; Walter Knapp, both of Taufkirchen; Wolfgang Zahn, Munich, all of Fed. Rep. of Germany

[73] Assignee: AGFA-Gevaert, AG, Leverkusen, Fed. Rep. of Germany

[21] Appl. No.: 751,603

[22] Filed: Dec. 17, 1976

[30] Foreign Application Priority Data

Dec. 20, 1975 [DE] Fed. Rep. of Germany ....... 2557756

[51] Int. Cl.² .................... G03B 27/32; G03B 27/52
[52] U.S. Cl. ........................................ 355/32; 355/77
[58] Field of Search ................ 355/16, 18, 32, 35, 355/38–42, 29, 77, 83, 88

[56] References Cited

U.S. PATENT DOCUMENTS

| | | | |
|---|---|---|---|
| 3,260,153 | 7/1966 | Abbott et al. | 355/45 X |
| 3,454,336 | 7/1969 | Wick et al. | 355/29 |
| 3,492,071 | 1/1970 | Limnios et al. | 355/83 |

*Primary Examiner*—Donald A. Griffin
*Attorney, Agent, or Firm*—Michael J. Striker

[57] ABSTRACT

The strip of originals is transported through an evaluating station where the originals are evaluated with respect to density, color, copiability, or the like. Information indicative of the results of these evaluations is manually entered upon a strip-shaped first information carrier in spatial coordination with the originals of the strip. Thereafter, at another location, the information on the first information carrier is transferred to a second information carrier. The strip of evaluated originals is then transported to a copying apparatus and there copied in accordance with the information on the second information carrier. The strip of originals itself can be utilized as the second information carrier.

12 Claims, 4 Drawing Figures

METHOD AND APPARATUS FOR EVALUATING AND PROCESSING A STRIP OF ORIGINALS TO BE COPIED

BACKGROUND OF THE INVENTION

The invention relates to a method of evaluating and processing a strip of originals to be copied, of the type wherein prior to the copying of the originals at a copying station, the originals are evaluated with respect to density, color and copiability, with the values thusly determined being entered upon an information carrier. The invention also relates to an apparatus for performing this type of method.

In general, with methods of this type, the originals to be copied are evaluated at an evaluating station, either by a human operator or by automatic means, to determine whether each such negative exhibits any unusual characteristics such as might require alteration of the operation of the automatic exposure control means provided at the copying station. Such unusual characteristics could for example include a dominant hue, lack of image sharpness, or complete lack of exposure. These characteristics are ascertained at the evaluating station and there entered upon an information carrier for evaluation at the copying station during copying.

In prior-art methods, negatives are displayed batchwise at the evaluating station, so that the human operator will simultaneously look over a plurality of negatives and make the necessary evaluations. The results of these evaluations are entered into a storage device using a keyboard present at the evaluating station. Upon completion of the evaluation of the batch of negatives at the evaluating station, the stored information is entered upon an information carrier. Later on, this information carrier is fed, along with the strip of originals, into the copying station, where the information carrier is read in a manner coordinated with the associated negatives. This method is extremely expensive, because of the cost involved in the electronic circuitry for the storage device; in one known apparatus, the storage device has the form of a shift register circuit.

Furthermore, a considerable problem is presented by the synchronization of the information carrier and the strip of originals. Synchronizing means must be provided both at the evaluating station and at the copying station. If a circuit malfunction should occur in either of these two synchronizing means, the coordination between the original and the information associated therewith can be lost, i.e., an offset can develop as between the original and its associated information, resulting in improper copying of a considerable number of originals.

SUMMARY OF THE INVENTION

It is a general object of the invention to provide a method of the type discussed above wherein a simpler and cheaper storage procedure is afforded without detracting from the speed at which processing of the strip of originals can proceed.

It is an ancillary object to provide a simplified solution to the synchronization problem discussed above.

According to a broad concept of the invention, this object and others which will become more understandable from the detailed description below, can be met by transporting the strip of originals to an evaluating station, there evaluating the originals with respect to density, color, copiability, or the like, manually entering information indicative of these evaluations upon a strip-shaped first information carrier in spatial coordination with the originals of the strip, then at another location transferring the information from the first information carrier to a second information carrier, and thereafter transporting the strip of evaluated originals to a copying apparatus and there copying the originals in accordance with the information on the second information carrier.

It is another object of the invention to provide an apparatus for performing the inventive method. This apparatus is to be of very simple construction and easy and fast to operate.

According to another broad concept of the invention, the processing apparatus comprises an evaluating station at which the strip of originals is displayed and visually evaluated, a strip-shaped first information carrier upon which information indicative of the evaluations can be entered, means for transporting the strip of originals and the first information carrier parallel to and in step with each other away from the evaluating station along a predetermined path, and a reading and encoding station located downstream of the evaluating station operative for reading the information on the first carrier and transferring that information in encoded form onto a second information carrier in an arrangement coordinated with the corresponding ones of the originals of the strip of originals.

The invention achieves an extremely inexpensive intermediate storage of the information in question. Additionally, the invention has the advantage that the human operator, after entering the exposure-correction information on the first carrier, can thereafter very easily glance over such information for double-check or monitoring purposes.

According to a preferred concept of the invention, the strip of originals itself is utilized as the second information carrier. This makes for an absolutely reliable and perfectly synchronized transmission of exposure-correction information to the exposure control means at the copying station. Additionally, the exposure-correction information on the strip of originals, provided in the form of coded notches for example, is readily legible and therefore monitorable at all stages of processing. The exposure-correction information, because it remains provided on the strip of originals itself, can be utilized for copying reorders as well as for multiple-copy orders in which the correction can be effected without knowledge of the printer corrections.

Present estimates indicate that, for the next years, about five units of information per original should be completely sufficient for minimizing rejects. Additionally, a low number of information units makes for quicker and easier decisions on the part of the human operator as he is performing his classifying task.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
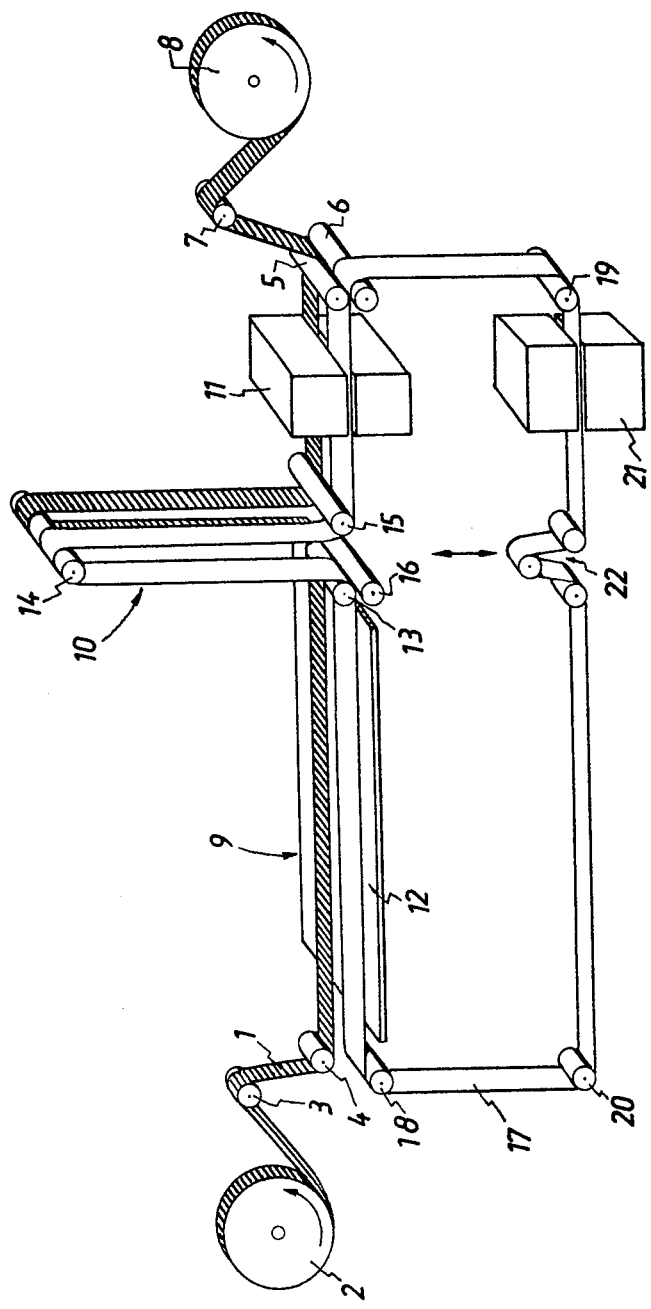
FIG. 1 is a perspective view of an apparatus for performing the inventive method.

In FIG. 1, numeral 1 denotes a strip of originals to be copied. The strip 1 is transported from a supply roll 2, via guide rollers 3, 4, a transport roller pair 5, 6 and a guide roller 7, to a take-up roll 8. Arranged between the guide roller 4 and the transport roller pair 5, 6 are an evaluating station 9, an intermediate strip storage device 10, and a reading and encoding station 11. The evaluating station 9 is provided with a transparent plate 12 illuminated from below by a (non-illustrated) longitudinally extending light source. The intermediate strip storage device 10 includes a stationary infeed roller 13, a roller 14 mounted for movement in vertical direction, and a stationary outfeed roller 15. A counterpressure roller 16 cooperates with the stationary infeed roller 13.

Provided alongside the transport path for the strip of originals 1 is the transport path of a strip-shaped first information carrier 17, advantageously located in front of the transport path of the originals, i.e., intermediate the strip of originals 1 and the working area for the human operator. Strip 17 is transported over a guide roller 18 into the evaluating station 9 and then travels parallel to the strip of originals 1 through the evaluating station 9, the intermediate strip storage device 10 and the reading and enclosing station 10, to the transport roller pair 5, 6. From there, strip 17 is transported back to the infeed roller 13, either within the apparatus itself or beneath the work table for the human operator, via guide rollers 19 and 20. A cleaning station 21 is located downstream of the reading and encoding station 11. A further intermediate strip storage device 22 is located downstream of the cleaning station 21. Strip 17 is an endless strip, preferably made of a white or transparent synthetic plastic material.

The operation of the apparatus shown in FIG. 1 is as follows:

At any one time, a plurality of the originals of strip 1 will be displayed at the evaluating station 9, for example twelve originals at a time. The human operator evaluates these negatives with respect to density, color, copiability, or the like. If a density correction is necessary, if one color predominates in certain negatives, of if a negative is not copiable at all, the operator enters the results of such evaluations in coded form onto the strip 17. With batches of twelve negatives simultaneously displayed at the evaluating station, on the average no more than two or three corrections will be required. As soon as the human operator has evaluated all twelve negatives and entered the necessary exposure-correction data onto strip 17, he activates a (non-illustrated) switching device which sets the drive 13, 16 into operation. At the same time, the vertically shiftable guide roller 14 moves from its lowest position upward, so that the twelve originals in the evaluating station 9, as well as the associated section of strip 17, will be pulled out of the evaluating station. Also, this movement of rollers 13, 16 and 14 causes the next group of originals to be evaluated, as well as a corresponding fresh section of strip 17, to be pulled into the evaluating station 9, whereupon the operator performs another evaluating and information-entering operation. During the evaluation of this second group of 12 negatives, the downstream sections of the strips 1 and 17 are fed by transport roller pair 5, 6 to the reading and encoding station 11 in a step-by-step fashion, one original and one corresponding section of strip 17 at a time.

At station 11, the coded information entered on strip 17 by the human operator is read by machine means, and the originals of strip 1 are notched by machine means in correspondence to such coded information, in a manner discussed below. During the progress of this synchronized step-by-step transport, the intermediate strip storage device 10 becomes emptied, i.e., the movable roller 14 moves down step-by-step to its low position. Downstream of the transport roller pair 5, 6, the strip of originals 1 is collected on a take-up roll 8, whereas the strip 17 travels through a cleaning station 21. There, the coded information entered on strip 17 by the operator is erased or washed off. However, the transport of strip 17 through the cleaning station 21 proceeds relatively continuously, compared to the long dwell times of the successive sections of strip 1 at the evaluating station 9. As a result, it is advantageous to provide, intermediate the cleaning station 21 and the evaluating station 9, a second intermediate strip storage device 22. Strip storage device 22 receives the strip emerging from the cleaning station and stores an accumulating length of such strip until such time as a fresh section of strip is to be advanced into the evaluating station 9.

Figure 2A:
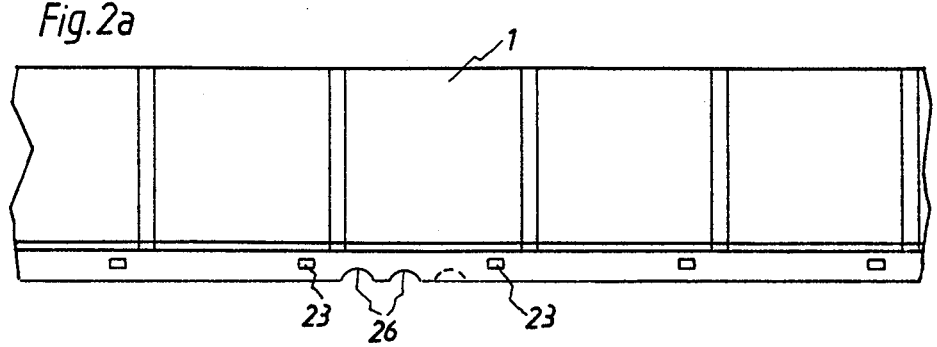
FIGS. 2a and 2b depict encoding possibilities for different film types.
Figure 2B:
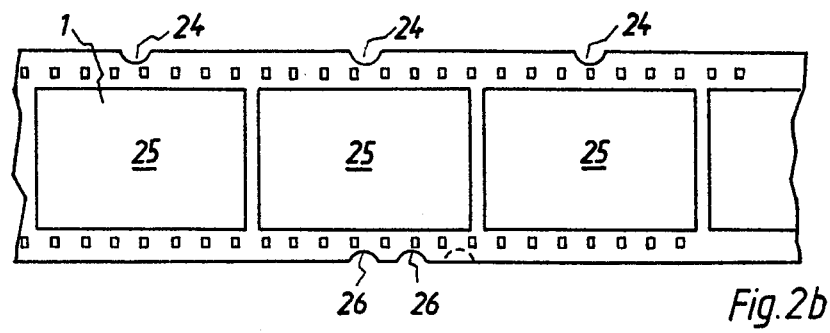

FIGS. 2a and 2b depict notch codes which can be stamped into the originals of strip 1 in dependence upon the coded information on strip 17. FIG. 2a depicts film of type 126. In order that the notch coding be properly coordinated with the associated negatives, the coding station 11 must be able to sense an original-dependent reference point. With film of type 126 (and likewise of type 110), this can be effected by sensing the perforated hole 23 present in the film. With film of type 135 (Leica film), the originals are usually provided along one side with edge notches 24 intended to indicate the centers of the images 25, which here are not spatially coordinated with the perforated apertures of the film. These notches 24 can be used as the reference point for encoding purposes. As shown in FIG. 2b, the notch code 26 representative of the results of the exposure-correction evaluations can be provided at the edge of the film opposite to that provided with the notches 24.

Figure 3:
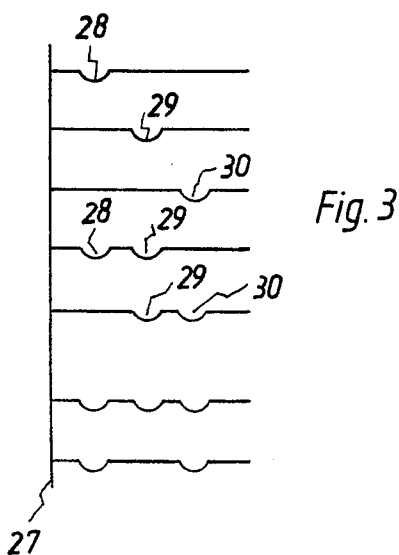
FIG. 3 depicts one proposed code for the exposure-correction information.

FIG. 3 depicts one embodiment of a notch code which can be used for the present invention. Vertical line 27 indicates the reference point, which as shown in FIGS. 2a and 2b can be either the perforated aperture 23 or the notch 24. Different numbers of notches can be stamped into the original at different distances from this reference line 27. Experience has indicated that five possible notch locations are sufficient for evaluation purposes. Notch location 28 can correspond to the evaluation "exprint," i.e., the decision that the negative ought not to be printed at all. Notch locations 28, 29 and 30 can be used for notches together indicative of density correction values. Notches 29 and 30 can, for example, together indicate a color undercorrection. With three notches in three positions, not all combinational possibilities are available, and therefore as shown in FIG. 3 it is necessary to provide two reserve notch locations.

An advantageous condition for trouble-free performance of the inventive method is that the information carrier strip 17 be transported from the evaluating station 9, through the storage device 10 and into the reading and encoding station 11 with as little slip as possible relative to the simultaneously transported strip of originals 1, specifically with a slip tolerance of ±5mm.

However, this slip tolerance is well within the state of the art.

The first information carrier need not be an erasable white or transparent strip of synthetic plastic material, transported as an endless strip through the evaluating, coding and cleaning stations. For coding purposes, the strip 17 is advantageously divided into two or three tracks, and the human operator can apply the coded information readable at the station 11 by placing dark stripes on these tracks alongside the originals. The strip 17 could be a very cheap paper strip which is continuously discarded as it is used. In that case, strip 17 would be pulled off a supply roll, fed into the evaluating station, and after emerging from the transport roller pair 5, 6 be thrown away. The cleaning station and the second storage device 22 could then be eliminated.

For the endless-strip embodiment, use can be made of a nagnetic recording tape and a cooperating electronic recording device. The encoded information can be applied to the recording tape by magnetic means. The advantage of a magnetic recording tape is in the ease with which it can be erased; its disadvantage is that the information entered on it cannot be visually read and monitored or checked by the operator during processing.

One advantageous possibility for the information carrier strip 17 is an endless strip provided with a photochromatic layer. Photochromatic layers undergo a change of color when exposed to light of certain wavelengths. The entering of coded information onto such a photochromatic strip could be effected using an illuminated pencil which would be moved over corresponding portions of the strip. At these locations, the photochromatic strip will darken, and this darkening will persist for a certain time period, and in any event at least for the time until the coded information reaches station 11 and is there read and transferred. To erase the coded information from the photochromatic strip, the erasing station 21 can very simply be provided with an infrared light source. The advantage of this expedient is that information can be entered on the strip 17 without physically contacting the strip, which makes for a long useful lifetime of the strip.

It will be understood that each of the elements described above, or two or more together, may also find a useful application in other types of constructions and procedures differing from the types described above.

While the invention has been illustrated and described as embodied in a method and apparatus for processing a strip of photographic negatives, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus for processing a strip of originals to be copied, in combination, an evaluating station at which the strip of originals can be displayed and evaluated, a strip-shaped first information carrier upon which information indicative of the evaluations can be entered, means for transporting the strip of originals and the first information carrier parallel to and in step with each other away from the evaluating station along a predetermined path, and a reading and encoding station located downstream of the evaluating station operative for reading the information on the first carrier and transferring that information in encoded form onto a second information carrier in an arrangement coordinated with the corresponding ones of the originals of the strip of originals.

2. The apparatus defined in claim 1, the reading and encoding station being adapted to utilize for the second information carrier the strip of originals itself and being provided with means for stamping into an edge portion of the strip of originals notches constituting the encoded information transferred from the first information carrier.

3. The apparatus defined in claim 1, the means for transporting comprising means for transporting an upstream portion of the strip of originals and of the first information carrier through the evaluating station at one speed and a downstream portion of the strip of originals and of the first information carrier through the reading and encoding station at a different speed and including intermediate the evaluating station and the reading and encoding station an intermediate strip storage arrangement operative for compensating for the different transport speeds.

4. The apparatus defined in claim 3, the first information carrier being an endless strip repeatedly transported through said stations, further including downstream of the reading and encoding station and upstream of the evaluating station a further intermediate strip storage arrangement likewise operative for compensating for the different transport speeds.

5. The apparatus defined in claim 1, the first information carrier being an endless strip of synthetic plastic material, the apparatus further including a cleaning station arranged in the transport path of the first information carrier downstream of the reading and encoding station and provided with means for removing from the first information carrier information entered thereon.

6. The apparatus defined in claim 1, the first information carrier being an endless strip of magnetic recording medium, the evaluating station being provided with means for magnetically entering information on the first carrier, the reading and encoding station being provided with means for reading magnetically entered information on the first carrier, the apparatus further including an erasing station arranged in the transport path of the first information carrier downstream of the reading and encoding station and provided with means for erasing from the first information carrier information magnetically entered thereon.

7. The apparatus defined in claim 1, the first information carrier being a disposable strip of paper transported but once through the evaluating station and the reading and encoding station.

8. The apparatus defined in claim 1, the first information carrier being an endless strip of synthetic plastic material provided with a layer of photochromatic material of the type upon which information can be entered by means of an illuminated pencil not physically contacting the photochromatic material, the apparatus further including an erasing station arranged in the transport path of the first information carrier downstream of the reading and encoding station and provided with an infrared light source for erasing information entered on the photochromatic material of the first information carrier.

9. In a method of processing a strip of originals to be copied, in combination, the steps of transporting the strip of originals to an evaluating station, evaluating the originals at the evaluating station with respect to density, color, copiability, or the like, entering information indicative of these evaluations upon a strip-shaped first information carrier in spatial coordination with the originals of the strip, thereafter at another location transferring the information from the first information carrier to a second information carrier, and transporting the strip of evaluated originals to a copying apparatus and there copying the originals in accordance with the information on the second information carrier, said step of transferring the information comprising transporting the first carrier to a reading and encoding station and there effecting machine reading of the information on the first carrier and machine entry onto the second carrier of the read information including the address information represented by said spatial coordination.

10. In a method of processing a strip of originals to be copied, in combination, the steps of transporting the strip of originals to an evaluating station, evaluating the originals at the evaluating station with respect to density, color, copiability, or the like, entering information indicative of these evaluations upon a strip-shaped first information carrier in spatial coordination with the originals of the strip, thereafter at another location transferring the information from the first information carrier to a second information carrier, and transporting the strip of evaluated originals to a copying apparatus and there copying the originals in accordance with the information on the second information carrier, using for the second information carrier the strip of originals itself, said step of transferring the information comprising effecting synchronized transport of the first carrier and of the strip of originals through a reading and encoding station, there effecting machine reading of the information on the first carrier as well as the production on the strip of originals of notches representing in encoded form the read information.

11. In a method of processing a strip of originals to be copied, in combination, the steps of transporting the strip of originals to en evaluating station, evaluating the originals at the evaluating station with respect to density, color, copiability, or the like, entering information indicative of these evaluations upon a strip-shaped first information carrier in spatial coordination with the originals of the strip, thereafter at another location transferring the information from the first information carrier to a second information carrier, and transporting the strip of evaluated originals to a copying apparatus and there copying the originals in accordance with the information on the second information carrier, said step of transferring the information comprising effecting synchronized transport of the first carrier and of the strip of originals through a reading and encoding station, there effecting machine reading of the information on the first carrier and machine encoding of corresponding information onto the second information carrier.

12. In a method of processing a strip of originals to be copied, in combination, the steps of transporting the strip of originals to an evaluating station, evaluating the originals at the evaluating station with respect to density, color, copiability, or the like, entering information indicative of these evaluations upon a strip-shaped first information carrier in spatial coordination with the originals of the strip, thereafter at another location transferring the information from the first information carrier to a second information carrier, and transporting the strip of evaluated originals to a copying apparatus and there copying the originals in accordance with the information on the second information carrier, using for the first information carrier an endless strip of erasable material, the step of entering information upon the first information carrier comprising erasably entering information on the endless strip; the method furthermore comprising the step of transporting the endless strip and also the strip of originals in synchronism with each other from the evaluating station to said other location and then transporting the endless strip from said other location back to said evaluating station through an erasing station, whereby to erase the information on the endless strip in order to prepare the endless strip for reuse.

* * * * *